United States Patent
Lee

(10) Patent No.: US 7,769,917 B1
(45) Date of Patent: Aug. 3, 2010

(54) METHOD AND APPARATUS FOR AUTOMATIC DEVICE CONNECTION DETECTION AND DATA EXCHANGE BY MONITORING POWER GROUND SIGNAL LEVEL CHANGE

(75) Inventor: Hanjin Lee, Skillman, NJ (US)

(73) Assignee: Koamtac, Inc., Princeton, NJ (US)

( * ) Notice: Subject to any disclaimer, the term of this patent is extended or adjusted under 35 U.S.C. 154(b) by 220 days.

(21) Appl. No.: 12/005,470

(22) Filed: Dec. 27, 2007

Related U.S. Application Data

(60) Provisional application No. 60/918,348, filed on Mar. 15, 2007.

(51) Int. Cl.
*G06F 13/10* (2006.01)
*G06F 15/00* (2006.01)
*H04B 1/38* (2006.01)

(52) U.S. Cl. .............. 710/18; 710/8; 710/9; 710/10; 710/15; 710/16; 710/17; 710/19; 710/72; 710/100; 710/305; 702/64; 702/186; 702/65; 375/219; 375/220; 375/221; 375/222

(58) Field of Classification Search ............ 710/100, 710/305, 15–19, 72, 8–10; 702/64, 65, 186; 375/219–222
See application file for complete search history.

(56) References Cited

U.S. PATENT DOCUMENTS

| | | | |
|---|---|---|---|
| 5,287,553 A * | 2/1994 | Korycan ................ 455/571 |
| 5,331,672 A | 7/1994 | Evans et al. |
| 5,649,210 A | 7/1997 | Allen |
| 5,721,458 A | 2/1998 | Kearney et al. |
| 5,761,463 A * | 6/1998 | Allen ..................... 710/305 |
| 5,812,796 A | 9/1998 | Broederner et al. |
| 5,909,464 A * | 6/1999 | Cohen et al. ............. 375/220 |
| 5,991,885 A | 11/1999 | Chang et al. |
| 6,070,216 A * | 5/2000 | Kitakami et al. .......... 710/305 |
| 6,088,754 A * | 7/2000 | Chapman ................ 710/305 |
| 6,772,249 B1 | 8/2004 | Lada et al. |
| 6,816,544 B1 * | 11/2004 | Bailey et al. ............ 375/222 |
| 6,885,978 B2 * | 4/2005 | Chu et al. ................ 702/186 |
| 7,039,742 B1 | 5/2006 | Lada et al. |
| 7,069,346 B2 * | 6/2006 | Lee ........................ 709/250 |
| 7,126,935 B1 * | 10/2006 | Brown et al. ............. 370/349 |
| 7,401,162 B2 * | 7/2008 | Baker et al. .................. 710/8 |

OTHER PUBLICATIONS

SeaChange Date Sheet C1: Serial Adaptor [online], Jun. 1998, SeaChange, 8 Horsted Square, Bell Lane Business Park, Uckfield, East Sussex TN22 IQQ, retrieved from the Internet on Mar. 18, 2003: <url:http//www.smartkontrols.co.uk/data/p/com/slt_data_clissl.pdf>.*

* cited by examiner

*Primary Examiner*—Tammara Peyton
(74) *Attorney, Agent, or Firm*—Gorman Law Offices

(57) ABSTRACT

A system and method for the provision for the auto detection and data exchange within different data transmission environments, such as those involving serial devices, Bluetooth-based devices, ZigBee-based devices, WiFi-based devices and/or WiMax-based devices is provided for in the present invention.

9 Claims, 4 Drawing Sheets

| Signal | | DB-25 | DE-9 |
|---|---|---|---|
| Common Ground | G | 7 | 5 |
| Transmitted Data | TD | 2 | 3 |
| Received Data | RD | 3 | 2 |
| Data Terminal Ready | DTR | 20 | 4 |
| Data Set Ready | DSR | 6 | 6 |
| Request To Send | RTS | 4 | 7 |
| Clear To Send | CTS | 5 | 8 |
| Carrier Detect | DCD | 8 | 1 |
| Ring Indicator | RI | 22 | 9 |

FIG. 3

METHOD AND APPARATUS FOR AUTOMATIC DEVICE CONNECTION DETECTION AND DATA EXCHANGE BY MONITORING POWER GROUND SIGNAL LEVEL CHANGE

PRIORITY CLAIM

This application claims priority from U.S. provisional application 60/918,348, filed on Mar. 15, 2007, the entirety of which is hereby incorporated by reference.

BACKGROUND OF THE INVENTION

1. Field of the Invention

The present invention relates generally to an improved approach for automatic detection and synchronization in handheld electronic units such as cell phones, etc. that may have the need for add-on units to be connected thereto. Such devices may include barcode scanners, PDAs, printers, scanners, and the like.

2. Description of the Related Art

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Hand held units such as computers, cell phones, personal digital assistants (PDAs) etc are becoming increasingly useful amongst consumers and industry. The connection of such devices to each other via various communication protocols would be most desirable if one device were to be able to detect the connection of other devices automatically and performs predefined data exchange process, especially if there were a straight forward method for auto detection and auto data exchange process, unfortunately this kind of auto device detection and auto data exchange method is not available in the prior art, such that serial and/or Bluetooth protocol or devices simply cannot provide for auto serial device detection and data exchange.

Prior art attempts, such as those exemplified by documents such as U.S. Pat. Nos. 5,649,210, 5,812,796, 5,721,458, 5,991,885, and 6,772,249, each of which are hereby incorporated by reference in their entireties, offer only crude solutions for attempting to determine if there is another device connected on the interface and sending data. Such prior art attempts typically revolve around either the manual launching of a communication routine through an interface means, or through the sending of an interrupt to the main processor when the UART receive-buffer receives data, and the constant polling of the UART status to see if there is data in the buffer. Such approaches, especially those involving polling techniques, have several flaws, the most significant of which is that the usage of constant polling is primarily directed at systems with embedded processors that do not have an available interrupt for UART buffer status, and in all cases, creates a resource drain on processor execution time, as well as a power drain on the batteries of portable devices.

Related attempts have been hitherto limited to the provision of say, polling or the like, but provision of such means that such devices would not have the capability for providing a signal that can offer connection detection. Because there are no additional signal lines available in the RS-232 standard used in prior art systems, there simply is no signaling means to show that one given device is connected to another device on its interface, and as such, auto detection is not possible. Even if one were somehow to try to utilize a USB-like auto detection (like that found in a PC), it simply would not be possible retrofit the existing serial connection wiring to accommodate the USB-like auto detection, and as such, this type of solution cannot be readily utilized when plugging into a device other than a PC. Moreover, the above approaches are particularly resource and power intensive, and in any case, still do not provide for the desired auto detection. Given the various drawbacks related to the usage of "polling" in serial connections, and considering the inability of serial devices to accommodate USB-like auto detection, there is clearly a need to provide for auto detection that works within the limitations of serial connectivity without the aforementioned drawbacks.

SUMMARY OF THE INVENTION

The present invention therefore comprises an improved system and method for, in one illustrative implementation, usage with serial interfaces, such that any DTE (Data terminal equipment) or device (such as a barcode reader or other associated device) that might be connected to the (serial) handheld DTE or DCE (Data Circuit-terminating Equipment) or device (e.g. cell phone, PDA, etc.) could automatically be detected, without the need for polling or USB porting, or without the need to manually launch a communication routine through a pushbutton or other user interface means. This is accomplished, by using, among other things, an additional Detect Signal (either a power-ground detect signal, or a Connect-Disconnect signal) and other techniques as described throughout. Provision of such may be employed in a multiplicity of communication environments, whether in a serial interface environment, or whether used in Bluetooth protocol-based devices, as well as other communication devices, such as ZigBee/WiFi/Wimax that normally cannot provide for auto device detection and data exchange.

Certain aspects commensurate in scope with the disclosed embodiments are set forth below. It should be understood that these aspects are presented merely to provide the reader with a brief summary of certain forms the invention might take and that these aspects are not intended to, limit the scope of the invention. Indeed, the invention may encompass a variety of aspects that may not be set forth below.

In accordance with one aspect of the present invention, there is provided an auto-detect interface comprising: auto-detect circuitry, wherein the auto-detect circuitry is situated proximate to least one DTE/DCE device, and contains an electrical connection for connecting the auto-detect circuitry to at least one port of the at least one DTE/DCE device; a logic-based structure contained within the auto-detect circuitry, the logic-based structure providing for generating an Auto Detection Output Signal upon the reception by the auto-detect circuitry of at least one Detect Signal transmitted from a serial interface circuit within the at least one DTE/DCE device. The auto-detect circuitry may further be configured so as to provide for data exchange between at least two DTE/DCE devices in addition to the generating of the Auto Detection Output Signal, and may further be configured so as to receive said at least one Detect Signal from the at least one DTE/DCE device, whether wired or wireless, and may include at least a Serial Detection line, a TxD line, an RxD line and a null modem. When provided in this manner, the auto-detect circuitry may also be further configured so as to generate a power signal that changes to a ground level signal, wherein the logic-based structure contained within the auto-detect circuitry has built in logic to detect the change to a ground level signal. To this end, the auto-detect circuitry may be contained, in one wired embodiment, within a DTE/DCE device and can be connected to the DCE unit by a cable that interfaces on a connector (such as a cable chosen from the group of class D-sub cables), wherein the TxD line and said RxD line are connected through said connector and are powered by a device power signal and are grounded by a device ground signal, and more specifically, may be structured so that the null modem forms a connection between a DTE device and a DCE of a given DTE/DCE device. In accordance with another aspect of the present invention, there is provided a wireless based embodiment wherein the auto-detect circuitry further is contained within the DTE/DCE device, and is connected to the DCE unit by a wireless interface, wherein said TxD line and said RxD line are further connected through the wireless interface and the auto-detect circuitry provides a connect/disconnect signal upon connection and disconnection between the TxD line and the RxD line.

BRIEF DESCRIPTION OF THE DRAWINGS

The foregoing and other advantages of the invention will become apparent upon reading the following detailed description and upon reference to the drawings in which:

FIG. 3 illustrates the range of established signal codes from a DTE perspective that might be employed within the implementation of one embodiment of the present invention.

DETAILED DESCRIPTION OF SPECIFIC EMBODIMENTS

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Accordingly, the present invention introduces a new system and method that can be used to automatically detect either a wired and/or wireless connection between two devices and executes the data exchange process automatically upon connected. This invention has various embodiments and includes the provision for such advantages among various communication protocols including USB, Serial and Bluetooth, as well as newer communication protocols, such as ZigBee, WiFi and WiMax.

In one such embodiment of the present invention, provision is made for said automatic communication establishment in serial devices through the use of an additional "Detect Signal", or "Power-Ground" detect signal available at the host device RS232 port. The RS-232 standard, or "RS232" is a standard for serial binary data signals connecting between a DTE (Data terminal equipment) and a DCE (Data Circuit-terminating Equipment) or other DTE. The DTE device can be a terminal and the DCE can be a modem, wherein the provision of both may involve usage of "null modem", which is a communication method to connect two DTEs directly using a cross-linked between transmit (TxD, or transmitted data) and receive (RxD or received data) lines in RS232 serial cable.

Figure 1:
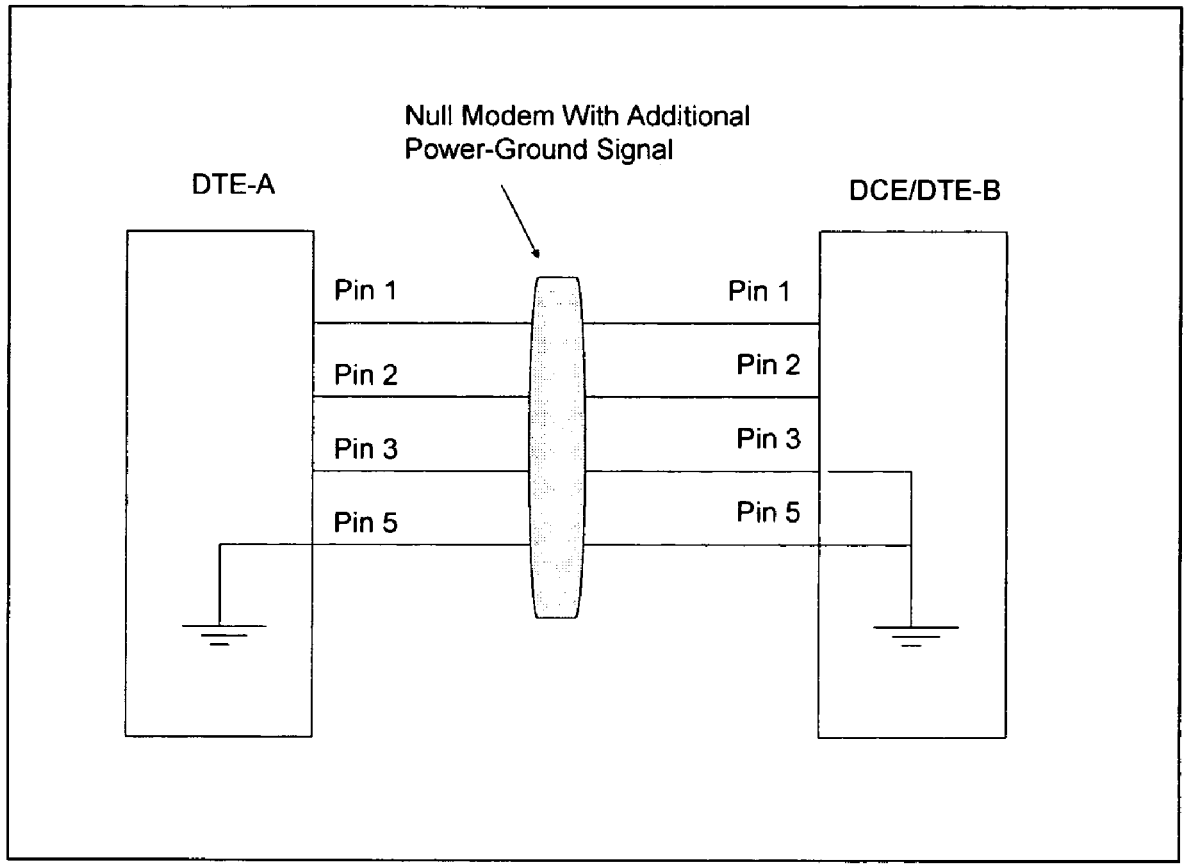
FIG. 1 depicts a general illustration of one embodiment of the inventive connection between an exemplary DTE/DCE device or handheld unit such as a personal digital assistant (PDA) or cell phone and a different DTE/DCE device.
Figure 2:
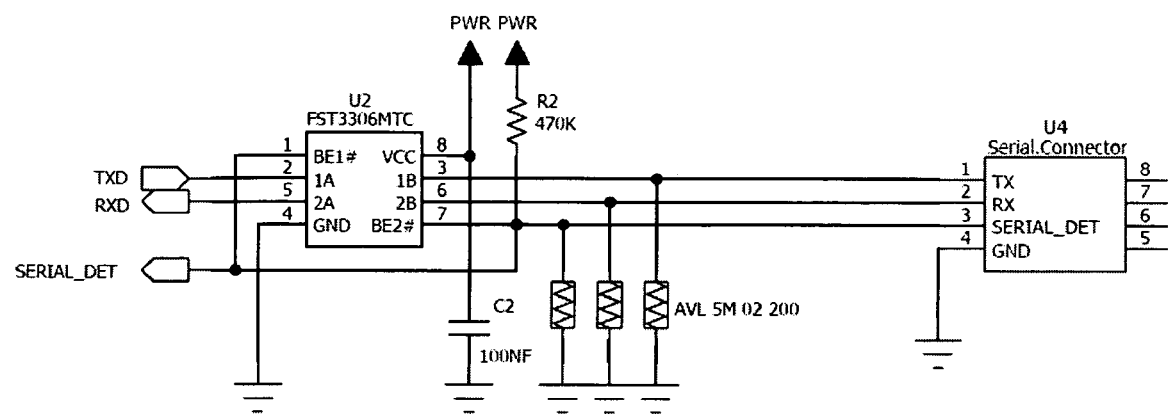
FIG. 2 depicts a more specific circuit level illustration of one embodiment of the inventive connection between an exemplary handheld unit such as a personal digital assistant (PDA) or cell phone and a different DTE/DCE device.

With general reference to FIGS. 1 and 2, in one embodiment of the present invention, the additional "Detect Signal" (e.g. a "Power-ground" detect signal or "Connected/Disconnected" signal) is provided through the provision of auto detection circuitry situated within at least one DTE/DCE device so as to be able to interface with existing or retrofitted pins as described herein. This circuitry provides the logic for auto detection, and may be provided for by installation of said circuitry within proximate connection to the existing or retrofitted connection port of the DTE/DCE device. In one embodiment, this circuitry may be provided for so as to have an immediate or direct electrical connection with the connection port of the DTE/DCE device.

Furthermore, in one embodiment, the first device needs to be designed with TxD, RxD, Serial Detect, and Ground lines, while the second device would only need to be provisioned with TxD, RxD and Ground lines in order to provide for a Detect Signal, such as a "Power-Ground" signal detection. When provided as such, a first device can be designed that interfaces to a second device so as to automatically detect the connection between the two within a serial communications environment. In one embodiment, a null modem (e.g. direct connection) with the power-ground signal may be provided so as to make a Serial Detect signal (or other equivalent detect signal, such as a "Connected/Disconnected" signal) that becomes an active "low" signal upon connecting the power-ground null modem. When provided in accordance with the above, the Serial Detect signal will become logic "high" state once the power-ground null modem is unplugged.

Thus, as specifically depicted in FIG. 2, which depicts an exemplary circuit diagram of the present invention, wherein: 310 indicates the Transmit Data Signal of DTE; 312 indicates the Receive Data Signal of DTE; 316 indicates Pins 2,3,5,6; 318 indicates the Device power signal; 315 indicates the Device ground signal; 314 indicates the Serial_DET signal. To this end, the illustrated circuit may be placed inside the DTE unit and may be connected to the DCE or other DTE unit by a cable that interfaces on connector U4, such that the TxD 310 and RxD 312 are connected through switch U2 at 316, which is powered at 318 and grounded at 315. Serial detection signal 314 may be connected to power signal 318 via register R2 and will maintain a "high" level if the power-grounded serial cable is not connected. Serial detection signal 314 becomes "low" level if power-ground serial cable is connected to U4. Low level Serial detection signal 314 therefore enables switch U2 and connects TxD 310 and RxD 312 signals between U2 and U4.

The null modem will connect the DTE and other DTE or DCE. The cable may ideally be selected from electrical connectors, such as those known as the class of D-sub cables or connectors. When provided as such, the present invention offers the advantages of not needing external or additional power like USB type circuitry, and needs no additional software on devices like cell phones, PDAs etc.

When the above structure is expressed in terms of an inventive method having discrete sub-processes or steps, the following exemplary particulars may be described within the:

1. At the outset, the DTE device has a power-ground circuit which maintains a logic "high" level if the power-grounded serial cable is not connected with DCE or other DTE device;
2. Upon plugging in the power-grounded serial cable in both devices, the DTE device power-ground signal changes the logical signal level to "0" from "1";
3. As a result, the DTE device controller will detect the power-ground signal level change, and will perform predefined operations, such as automatic data transmission to DCE or other DTE;
4. Subsequently, the power-ground signal changes the logic signal level to "1" once the power-grounded serial cable is unplugged; and
5. Thereafter, the DTE device controller detects the aforementioned power-ground signal level change, and performs predefined operations.

FIG. 3 illustrates the range of established signal codes from a DTE perspective that might be employed within the implementation of one embodiment of the present invention. In an illustration involving an R232-based implementation of the present invention, the D-subminiature or D-sub (a common type of electrical connector used particularly in computers) are commonly used for serial communications. Although other types of electrical connectors other than D-sub may be employed within the scope of the invention, for illustrative purposes, the disclosure herein may be directed to D-sub cables, particularly to DB25 (e.g. 25-pin D-sub), and/or especially for applications where less common signals can be omitted, a DE9 (e.g., 9-pin D-sub) may be utilized. In either case, the Table depicted in FIG. 3 exemplifies the range of established signal codes from a DTE perspective that might be employed within the implementation of one embodiment of the present invention.

One illustrative instantiation of the invention is shown below with the coupling of an exemplary DTE device such as a bar code reader, together with a DCE or other DTE device such as a cell phone or PDA. Although other auxiliary devices besides a barcode reader may be connected to many different types of handhelds (such as PDAs or cell phones), these types of devices will be used merely for simplicity of illustration, and are not meant to be limiting in any way:

A. The exemplary bar code reader has power signal in the interface;
B. The exemplary bar code reader custom cable would connect the power signal of the exemplary bar code reader to the ground signal of serial devices, such as cell phones, PDAs, etc.;
C. The exemplary bar code reader power signal would become ground level and exemplary bar code reader has a built in logic to detect this change;
D. This power to ground signal change detection enables exemplary aware of the connection to the other serial devices such as cell phone and PDA;
E. Now, the exemplary bar code reader can execute a transmission command automatically to the serial devices such as cell phone and PDA.

Without the present invention, the illustrative connection of the exemplary bar code reader to the serial device would operate such that the serial device would continually monitor the data transmission from the bar code reader without interruption, thereby draining out the battery of the serial devices, and possibly interrupting the existing operation of serial devices. Thus, an exemplary device such as a user's cell phone connected with any other device, like a bar code reader, would normally keep on running a separate program to check the data transmission from the exemplary bar code reader, because neither the exemplary bar code reader nor the cell phone could detect the connection each other without the benefit of the present invention.

For purposes of illustration, RS-232-based devices may be classified, as mentioned above, as Data Terminal Equipment (DTE) or Data Circuit termination Equipment (DCE), which defines at each device which wires will be sending and receiving each signal. For illustrative purposes, the below table summarizes RS232 signals from a DTE perspective within the inventive scheme. Accordingly, assume that DTE RS232 signal "A" (four wires) is defined as below, along with the corresponding DCE RS232 signal "B":

| Signal "A" (DTE) | Signal "B" (DCE) |
|---|---|
| Pin 1: TxD (TD, TX) | Pin 1: RxD (RD, RX) |
| Pin 2: RxD (RD, RX) | Pin 2: TxD (TD, TX) |
| Pin 3: Serial Detect | Pin 3: Ground |
| Pin 5: Ground | Pin 5: Ground |

Signal "A" (DTE) Signal "B" (DCE)

Pin 1: TxD (TD, TX) Pin 1: RxD (RD, RX)

Pin 2: RxD (RD, RX) Pin 2: TxD (TD, TX)

Pin 3: Serial Detect Pin 3: Ground

Pin 5: Ground Pin 5: Ground

In the above example, the signal "A" pin 3 would be pulled to ground once a cable is plugged into both devices. When provided as such, the DTE can detect the connection of DCE by monitoring the change of voltage of signal "A". The following signal lines are used in this illustrative example: (1) TxD(TX), (2) RxD(RX), (3) G(Common Ground) and (4) and peripheral interface signal line, such as a Serial_Detection:

In the illustrative Serial_Detection line, the signal is logic "high" if the external serial device is not connected because R2 pulls the signal "high" when Pin 3, U4 has no connection to it.

In such an illustration, the Serial_Detection signal becomes logic "low" once an external serial device is connected and Pin 3, U4 is pulled to ground level.

Using this technique, a first device can be designed that interfaces to a second device with a serial communication interface and automatically detects the connection. The second device only needs TxD and RxD lines. It also needs two pins that have ground connections on them. In this exemplary embodiment, the first device would need to be designed with TxD, RxD, Serial Detect, and Ground lines.

Figure 4:
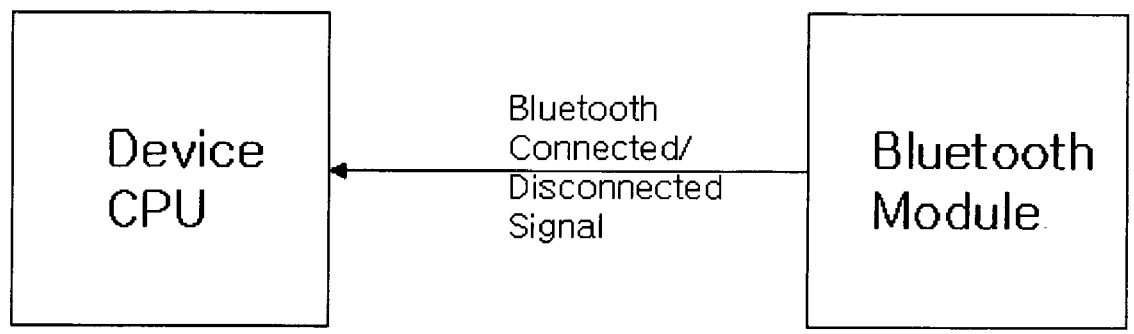
FIG. 4 depicts a general illustration of one embodiment of the inventive connection within an illustrative wireless or Bluetooth environment.

As mentioned above, the present invention may be used in a multiplicity of wired and wireless environments, over different communication protocols, including Bluetooth, ZigBee, WiFi and/or WiMax. Although each of these implementations may be provided for in substantially the same fashion as described above, with the wired-based implementation utilizing the aforementioned "Power-Ground Signal" ("Detect Signal"), and with wireless-based implementations utilizing the equivalent "Detect Signal", which may also be referred to as a "connected/disconnected signal", and is used in wireless protocols such as Bluetooth, ZigBee, WiFi and/or WiMax. Whichever specifics are employed within the inventive framework described herein, the exchange of data between devices is provided for through the aforementioned predefined procedures, once the inventive detection of connections has been automatically provided for therein. To this end, the following reference is made to FIG. 4 and further specifics are provided for below in one illustrative inventive process within an exemplary Bluetooth-based (or alternatively, a ZigBee, WiFi and/or WiMax) environment:

(1) At the outset, a definition, or generation of a Bluetooth "connected" signal is made within the native Bluetooth module upon connection to the other Bluetooth device;

(2) The CPU of the given device receives the Bluetooth "connected" signal from the Bluetooth module once the connected has been established with the other Bluetooth device;

(3) The device CPU receives the Bluetooth disconnected signal from the Bluetooth module once it has been disconnected from the other Bluetooth device;

(4) Thereafter, the device will manage applicable Bluetooth power based upon a predefined power management scenario, which in one illustration, might involve the device powering off the Bluetooth module upon receiving the "disconnected" signal from Bluetooth module, when the Bluetooth module power is "On";

Although the practical applications of the above are legion, in one embodiment the illustrative application of the invention to cell phones may prove especially useful. For example, it may be possible to utilize cell phones for more than just voice communications. To this end, cell phones may prove to be useful, versatile mobile terminals, which, with the advent of the present invention, may mean cellular phones provided with serial (or other peripheral communications) interfaces so as to provide DCE and DTE capability. When provided in accordance with the present invention, it may accordingly become quite popular to use cellular phones also for data processing through the provision of interoperability with diverse input and output devices, such as barcode and RFID readers that can be connected to cellular phones. It is therefore contemplated that at least one potential application of the invention disclosed herein may be applied in order to enhance mobile computing application through the provision of interoperability between a given cell phone and diverse input devices (barcode scanners, optical devices, scanners, medical diagnostics devices, electronic diagnostic devices, automotive diagnostic devices, power and utility meter readers, personal computers, portable memory drives, audio or visual equipment, police investigative devices such as breathalyzers and the like, and many other possible applications) together with diverse output devices (printers, personal computers, data uplinks, diagnostic interfaces for medical, automotive, and electronic devices, data analyzers, audio or visual equipment, police investigative devices such as breathalyzers and the like, and many other possible applications), all of which can begin the transmission of data to cellular phones automatically, once connected to the given cellular phone through the inventive system and method.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. An auto-detect interface for automatically detecting a connection between at least one DTE(Data Terminal Equipment)/DCE (Data Circuit Terminating Equipment) host device and another DTE/DCE comprising:
   auto-detect circuitry, wherein said auto-detect circuitry is situated proximate to said at least one DTE/DCE host device, and contains an electrical connection for connecting said auto-detect circuitry to at least one port of said at least one DTE/DCE host device;
   a logic-based structure contained within said auto-detect circuitry, said logic-based structure providing for generating, without needing to monitor any data transmission detection between said at least one DTE/DCE host device and said another DTE/DCE device, an Auto Detection Output Signal upon the reception by said auto-detect circuitry of at least one Detect Signal transmitted from a serial interface circuit within said at least one host DTE/DCE device, said Auto Detection Output Signal being generated by monitoring a power ground signal level change represented by said Detect Signal; and wherein said auto-detect circuitry is further configured so as to provide for data exchange between said at least one DTE/DCE host device and said another DTE/DCE device after said generating of said Auto Detection Output Signal.

2. The auto-detect interface of claim 1, wherein said:
   auto-detect circuitry is configured to receive said at least one Detect Signal across both wired or wireless connections.

3. The auto-detect interface of claim 2, wherein said:
   auto-detect circuitry further contains at least a Serial Detection line, a TxD line, an RxD line and a null modem.

4. The auto-detect interface of claim 3, wherein said:
   auto-detect circuitry is further configured so as to generate a power signal that changes to a ground level signal and wherein said logic-based structure contained within said auto-detect circuitry has built in logic to detect said change to a ground level signal.

5. The auto-detect interface of claim 4, wherein said:
   auto-detect circuitry further is contained within said at least one DTE/DCE host device and is connected to said another DTE/DCE device by a cable that interfaces on a connector, wherein said TxD line and said RxD line are connected through said connector and are powered by power ground signal and are grounded by power ground signal.

6. The auto-detect interface of claim 5, wherein said null modem forms a connection between a DTE device and a DCE of said at least one DTE/DCE host device.

7. The auto-detect interface of claim 6, wherein said auto-detect interface includes a connector for connecting to said DTE device of said at least one DTE/DCE host device.

8. The auto-detect interface of claim 7, wherein said connector of said auto-detect interface is a cable chosen from the group of class D-sub cables.

9. The auto-detect interface of claim 4, wherein said:
   auto-detect circuitry further is contained within said DTE/DCE host device and is connected to the DCE unit by a wireless interface, wherein said TxD line and said RxD line are further connected through said wireless interface and said auto-detect circuitry provides a connect/disconnect signal upon connection and disconnection between said TxD line and said RxD line.

* * * * *